US012263517B2

(12) United States Patent
Egawa et al.

(10) Patent No.: US 12,263,517 B2
(45) Date of Patent: Apr. 1, 2025

(54) PRESS APPARATUS AND METHOD FOR MANUFACTURING DIFFERENT-THICKNESS METAL PLATE

(71) Applicant: TOYOTA JIDOSHA KABUSHIKI KAISHA, Toyota (JP)

(72) Inventors: Tetsuji Egawa, Okazaki (JP); Masahide Tatsutomi, Toyota (JP); Tetsuya Asai, Miyoshi (JP); Shota Shimizu, Nisshin (JP); Takuya Shintani, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 409 days.

(21) Appl. No.: 17/841,830

(22) Filed: Jun. 16, 2022

(65) Prior Publication Data

US 2023/0037636 A1 Feb. 9, 2023

(30) Foreign Application Priority Data

Aug. 4, 2021 (JP) .................................. 2021-127974

(51) Int. Cl.
*B21D 28/02* (2006.01)
*B26D 3/00* (2006.01)
*B26D 7/01* (2006.01)

(52) U.S. Cl.
CPC .............. *B21D 28/02* (2013.01); *B26D 3/00* (2013.01); *B26D 7/01* (2013.01)

(58) Field of Classification Search
CPC . B23P 23/04; B23P 15/00; B23D 3/00; B23D 11/00; B23D 79/02; B26D 7/01; B26D 3/00; B21D 28/02
USPC ........................................................ 83/870
See application file for complete search history.

(56) References Cited

U.S. PATENT DOCUMENTS

| | | | |
|---|---|---|---|
| 2014/0318341 A1* | 10/2014 | Fait .................. | B27B 27/08 83/477 |
| 2018/0169723 A1 | 6/2018 | Ihara et al. | |
| 2018/0369936 A1* | 12/2018 | Egawa ............... | B23D 3/02 |

FOREIGN PATENT DOCUMENTS

| | | |
|---|---|---|
| JP | H02-74116 U | 6/1990 |
| JP | 2008-161945 A | 7/2008 |
| JP | 2015-089551 A | 5/2015 |
| JP | 2019-005823 A | 1/2019 |
| JP | 6638639 B2 | 1/2020 |

* cited by examiner

*Primary Examiner* — Nhat Chieu Q Do
(74) *Attorney, Agent, or Firm* — Oliff PLC

(57) ABSTRACT

A press apparatus according to an embodiment includes an upper die and a lower die, and configured to manufacture a different-thickness metal plate, in which: the lower die includes: a wall surface facing a cavity; a fixing part configured to fix both ends of the metal plate, the both ends of the metal plate being placed so that its plate surface faces upward; and a rotating mechanism configured to rotate the metal plate so that the metal plate is brought into an upright position along the wall surface; and the upper die includes: a slide moving part including an opposed surface opposed to the wall surface and configured to descend in the cavity along the wall surface; and a cutting tool disposed on the opposed surface; and shaving is carried out on at least a part of the plate surface of the metal plate.

3 Claims, 19 Drawing Sheets

PRESS APPARATUS AND METHOD FOR MANUFACTURING DIFFERENT-THICKNESS METAL PLATE

CROSS REFERENCE TO RELATED APPLICATIONS

This application is based upon and claims the benefit of priority from Japanese patent application No. 2021-127974, filed on Aug. 4, 2021, the disclosure of which is incorporated herein in its entirety by reference.

BACKGROUND

The present disclosure relates to a press apparatus and a method for manufacturing a different-thickness metal plate.

As disclosed in Japanese Unexamined Patent Application Publication No. 2008-161945, a shaving method using a press apparatus is widely used for the finishing of the surfaces of workpieces. The press apparatus disclosed in Japanese Unexamined Patent Application Publication No. 2008-161945 includes a slide supported in a main part of the press apparatus so as to be movable in the up/down direction, and a punch for shaving is attached to the slide. By this configuration, the press apparatus performs a cutting action on a workpiece and thereby carrying out shaving thereon.

SUMMARY

When shaving is carried out on a workpiece (a metal plate) having raised parts by using a press apparatus, it is appropriate to place the workpiece in a horizontal position in consideration of the conveyance thereof. However, a large apparatus needs to be used in order to perform pressing in the horizontal direction, so that a general-purpose (i.e., ordinary) press apparatus cannot be used in this case.

The present disclosure has been made to solve such a problem, and provides a press apparatus and a method for manufacturing a different-thickness metal plate capable of performing shaving, for a metal plate, by lowering a cutting tool.

A press apparatus according to an embodiment is a press apparatus including an upper die and a lower die, and configured to manufacture a different-thickness metal plate, in which the lower die includes: a wall surface facing a cavity; a fixing part configured to fix both ends of the different-thickness metal plate, the both ends of the different-thickness metal plate being placed so that its plate surface faces upward; and a rotating mechanism configured to rotate the different-thickness metal plate so that the different-thickness metal plate is brought into an upright position along the wall surface, and the upper die includes: a slide moving part including an opposed surface opposed to the wall surface and configured to descend in the cavity along the wall surface; and a cutting tool disposed on the opposed surface, and shaving is carried out on at least a part of the plate surface of the different-thickness metal plate, which has been brought into the upright position along the wall surface, by lowering the slide moving part. By the above-described configuration, it is possible to perform shaving on the different-thickness metal plate in the vertical direction, and thereby to perform different-thickness processing in a short time and at low cost.

In the above-described press apparatus, the upper die may include a roller projecting from the opposed surface of the slide moving part, the cutting tool may project beyond the roller on the opposed surface, and the shaving may be performed while the different-thickness metal plate is being pressed by the roller when the slide moving part descends. By the above-described configuration, it is possible to perform shaving in a short time while fixing the different-thickness metal plate in the upper die.

In the above-described press apparatus, the cutting tool may have a parallelogram shape in cross-section as viewed in a direction orthogonal to a direction in which the plate surface of the different-thickness metal plate faces and a direction in which the slide moving part moves, the opposed surface of the slide moving part may include a stepped surface parallel to the opposed surface, and a surface constituting one side of the parallelogram may be disposed on the stepped surface, and a surface constituting another side of the parallelogram opposed to the one side may project beyond the roller on the opposed surface. By the above-described configuration, it is possible to increase the service life of the cutting tool.

In the above-described press apparatus, the lower die may include a cylinder configured to fix the different-thickness metal plate. By the above-described configuration, it is possible to fix the different-thickness metal plate in the lower die, and thereby to improve the durability.

A method for manufacturing a different-thickness metal plate according to an embodiment is a method for manufacturing a different-thickness metal plate by using a press apparatus including an upper die and a lower die, the method including: fixing both ends of the different-thickness metal plate, the both ends of the different-thickness metal plate being placed so that its plate surface faces upward; rotating the different-thickness metal plate so that the different-thickness metal plate is brought into an upright position along a wall surface facing a cavity in the lower die; and carrying out shaving, when a slide moving part of the upper die is lowered in the cavity along the wall surface, on at least a part of the plate surface of the different-thickness metal plate, which has been brought into the upright position along the wall surface, by a cutting tool disposed on an opposed surface of the slide moving part opposed to the wall surface. By the above-described configuration, it is possible to perform shaving on the different-thickness metal plate in the vertical direction, and thereby to perform different-thickness processing in a short time and at low cost.

In the above-described method for manufacturing a different-thickness metal plate, in the carrying out the shaving, the upper die may include a roller projecting from the opposed surface of the slide moving part, and the cutting tool may project beyond the roller on the opposed surface, and the shaving may be performed while the different-thickness metal plate is being pressed by the roller when the slide moving part descends. By the above-described configuration, it is possible to perform shaving in a short time while fixing the different-thickness metal plate in the upper die.

In the above-described method for manufacturing a different-thickness metal plate, in the carrying out the shaving, the cutting tool may have a parallelogram shape in cross-section as viewed in a direction orthogonal to a direction in which the plate surface of the different-thickness metal plate faces and a direction in which the slide moving part moves, the opposed surface of the slide moving part may include a stepped surface parallel to the opposed surface, and a surface constituting one side of the parallelogram may be disposed on the stepped surface, and a surface constituting another side of the parallelogram opposed to the one side may project beyond the roller on the opposed surface. By the above-described configuration, it is possible to increase the service life of the cutting tool.

The above-described method for manufacturing a different-thickness metal plate may further include, after the rotating step, fixing the different-thickness metal plate by a cylinder provided in the lower die. By the above-described configuration, it is possible to fix the different-thickness metal plate in the lower die, and thereby to improve the durability.

The above-described method for manufacturing a different-thickness metal plate may further include, before the performing the shaving, pressing the different-thickness metal plate by a press die so that a projecting part is formed on one of plate surfaces of the different-thickness metal plate and a recessed part is formed on the other plate surface of the different-thickness metal plate. By the above-described configuration, it is possible to improve the degree of freedom in regard to the shape of the different-thickness metal plate.

In the above-described method for manufacturing a different-thickness metal plate, in the carrying out the shaving, the shaving may be performed on the projecting part. By the above-described configuration, it is possible to perform different-thickness processing on the projecting part of the different-thickness metal plate.

In the above-described method for manufacturing a different-thickness metal plate, in the carrying out the shaving, the shaving may be performed on the recessed part. By the above-described configuration, it is possible to perform different-thickness processing on the recessed part of the different-thickness metal plate.

The above-described method for manufacturing a different-thickness metal plate may further include, before the performing the shaving, at least one of hole punching and edge bending for the different-thickness metal plate. By the above-described configuration, it is possible to improve the degree of freedom in regard to the shape of the different-thickness metal plate.

In the above-described method for manufacturing a different-thickness metal plate, in the carrying out the shaving, a thickness by which the different-thickness metal plate is shaved by the shaving may be 5% or less of a sliding distance of the cutting tool. By the above-described configuration, it is possible to improve the quality of the different-thickness metal plate.

According to an embodiment, it is possible to provide a press apparatus and a method for manufacturing a metal plate capable of performing shaving on a metal plate by lowering a cutting tool provided in the press apparatus, and capable of performing different-thickness processing in a short time and at low cost.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
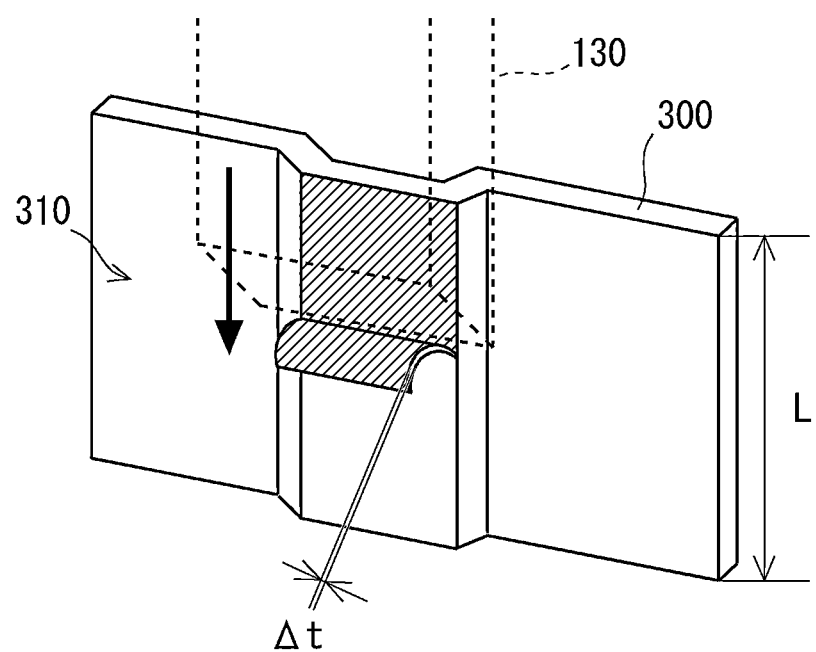
FIG. 1 is a perspective view showing an example of a metal plate on which shaving according to a first embodiment is performed.

The present disclosure will be described hereinafter through embodiments according to the present disclosure. However, the below-shown embodiments are not intended to limit the scope of the present disclosure specified in the claims. Further, all the components/structures described in the embodiments are not necessarily indispensable as means for solving the problem. For clarifying the explanation, the following description and the drawings are partially omitted and simplified as appropriate. The same reference numerals (or symbols) are assigned to the same elements throughout the drawings and redundant descriptions thereof are omitted as appropriate.

First Embodiment

A press apparatus and a method for manufacturing a different-thickness metal plate according to a first embodiment will be described. In order to form a different-thickness metal plate having a thickness difference using one metal plate, for example, so-called shaving, in which a metal plate is cut (i.e., shaved) by using a cutting tool so that the thickness of the metal plate is reduced by a predetermined thickness in a general-purpose (i.e., ordinary) clamp press apparatus, is suitable to reduce the processing time and the cost. In a press apparatus and a method for manufacturing a different-thickness metal plate according to this embodiment, for example, the metal plate is rotated 90 [deg] from a state where it is horizontally placed (hereafter, a horizontally-placed state) to an upright state, and then shaving is performed by lowering a cutting tool from above the metal plate to below the metal plate. Then, after the shaving, the metal plate is rotated −90 [deg] and thereby returned to the horizontally-placed state. In this way, it is possible to perform shaving, for the metal plate, by lowering the cutting tool, i.e., by using the press apparatus. In the following description, firstly, <Outline of Shaving> will be described, and then <Configuration of Press Apparatus> will be described. After that, <Method for Manufacturing Different-thickness Metal Plate> using the press apparatus will be described.

<Outline of Shaving>

FIG. 1 is a perspective view showing an example of a metal plate on which shaving according to the first embodiment is carried out. As shown in FIG. 1, a press apparatus according to this embodiment carries out shaving on a plate surface 310 of a metal plate 300 by sliding a cutting tool (i.e., a shaving tool) 130 downward. A length in the direction in which the cutting tool 130, by which the shaving is carried out, is moved is referred to as a shaving length L, and a thickness by which the metal plate 300 is cut (i.e., shaved) (i.e., by which the thickness of the metal plate 300 is reduced) by the shaving is referred to as a shaving thickness Δt. The shaving length L is also referred to as a sliding distance of the cutting tool 130. The shaving is carried out under the condition that the shaving thickness Δt is smaller than or equal to 5% of the shaving length L (the sliding distance). That is, in the shaving, the thickness Δt by which the metal plate 300 is cut (i.e., shaved) (i.e., by which the thickness of the metal plate 300 is reduced) by the shaving is smaller than or equal to 5% of the sliding distance of the cutting tool 130.

Through the above-described shaving, it is possible to make the thickness of a part of the metal plate 300 thinner than the thickness of other parts of the metal plate 300. Further, it is possible to improve the processing accuracy in the shaving and thereby to improve the quality of the different-thickness metal plate. When the thickness Δt by which the metal plate 300 is cut (i.e., shaved) by the shaving exceeds 5% of the sliding distance of the cutting tool 130, the processing mode (i.e., the shaving mode) becomes a punching mode, which is processing completely different from the shaving. Note that the shaving may be performed a plurality of times for the metal plate 300. Further, a product may be formed by performing press forming after the shaving, or press forming may be performed on the metal plate to some extent before the shaving. Examples of the metal plate 300 include, but are not limited to, a steel plate, an aluminum plate, and a stainless-steel plate. Example of components for which the shaving is used include, but are not limited to, components for vehicles (e.g., automobiles).

<Configuration of Press Apparatus>

Next, a configuration of a press apparatus 1 will be described. Each of FIGS. 2 to 8 is a perspective view of a step, showing an example of a configuration of a press apparatus and a method for manufacturing a different-thickness metal plate using the press apparatus according to the first embodiment. As shown in FIGS. 2 to 8, the press apparatus 1 includes an upper die 100 and a lower die 200. FIGS. 3 to 7 also show cross-sectional diagrams. Further, FIGS. 2, 5 and 8 also show enlarged diagrams. As shown in FIG. 5, the upper die 100 is positioned above the lower die 200 at least when shaving is performed. The upper die 100 includes a main part 110, a slide moving part 120, and a cutting tool 130. The lower die 200 includes a main part 210, a fixing part(s) 220, a rotating mechanism 230, and a wall surface 240.

Figure 2:
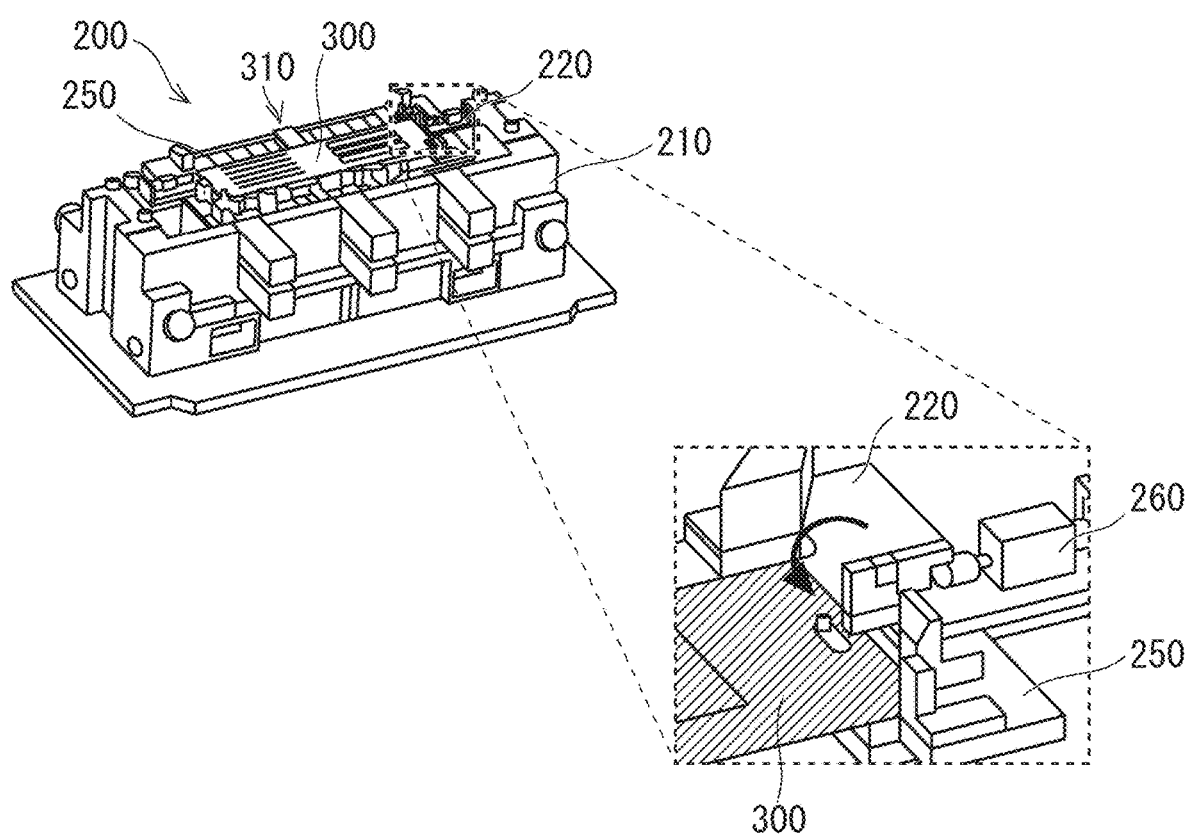
FIG. 2 is a perspective view of a step, showing an example of a configuration of a press apparatus and a method for manufacturing a different-thickness metal plate using the press apparatus according to the first embodiment.
Figure 3:
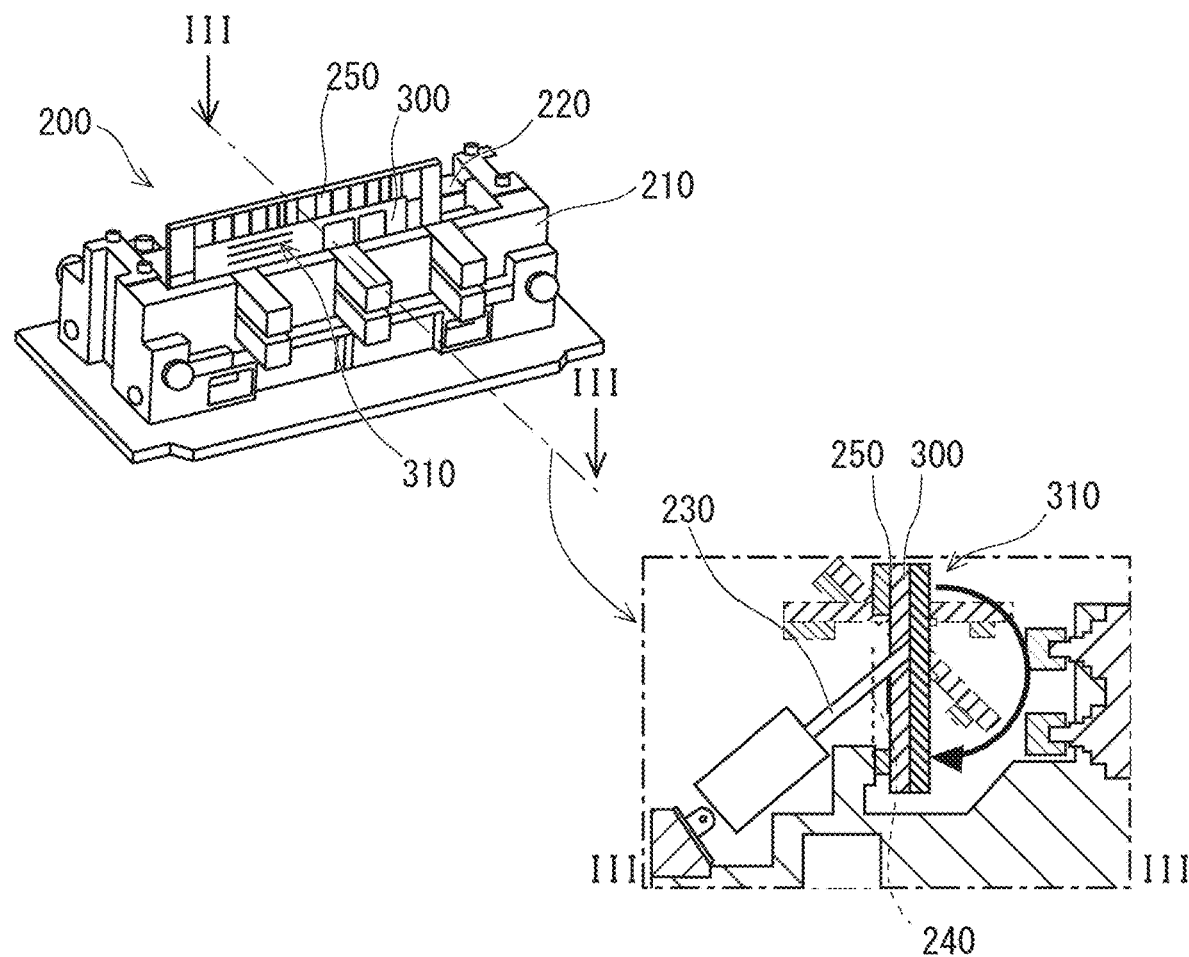
FIG. 3 is a perspective view of a step, showing an example of a configuration of a press apparatus and a method for manufacturing a different-thickness metal plate using the press apparatus according to the first embodiment.

Firstly, a configuration of the lower die 200 will be described. As shown in FIGS. 2 and 3, the main part 210 of the lower die 200 has, for example, roughly a rectangular parallelepiped shape, and is disposed on a floor surface. The main part 210 supports the fixing part 220 and the rotating mechanism 230. Note that the shape and position of the main part 210 is not limited to any particular shapes and positions as long as the main part 210 can support the fixing part 220 and the rotating mechanism 230.

The fixing part 220 fixes the metal plate 300. Specifically, for example, the fixing part 220 fixes both ends of the metal plate 300 in a horizontally-placed state in which the metal plate 300 is laid down so that the plate surface 310 thereof faces upward. Specifically, for example, the metal plate 300 is horizontally-placed on a blank pedestal 250. The fixing part 220 includes a clamp and fixes the metal plate 300 to the blank pedestal 250 by using a clamp air cylinder 260. The rotating mechanism 230 rotates the metal plate 300 so that the metal plate 300 is brought into an upright position along the wall surface 240.

Figure 4:
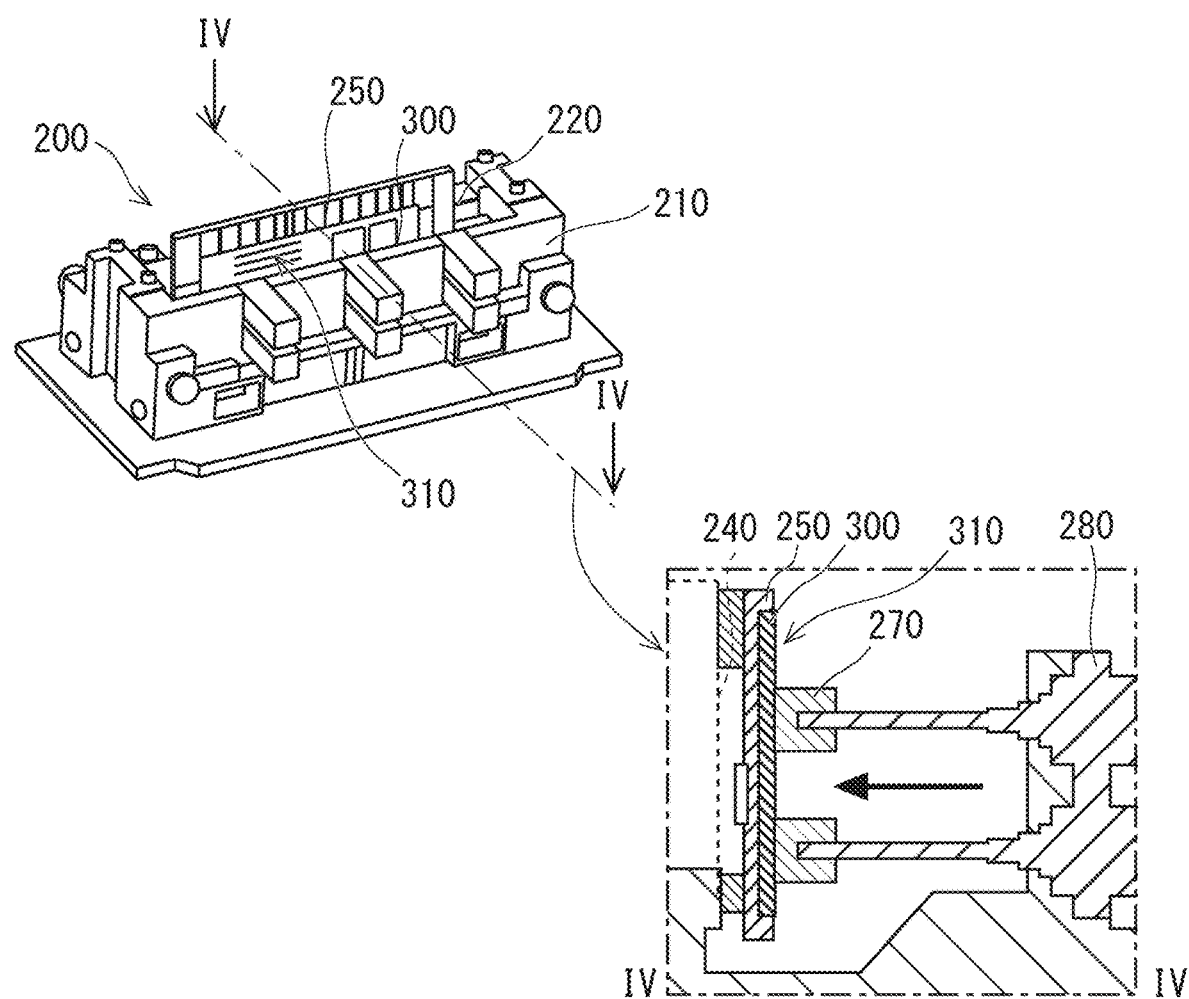
FIG. 4 is a perspective view of a step, showing an example of a configuration of a press apparatus and a method for manufacturing a different-thickness metal plate using the press apparatus according to the first embodiment.
Figure 5:
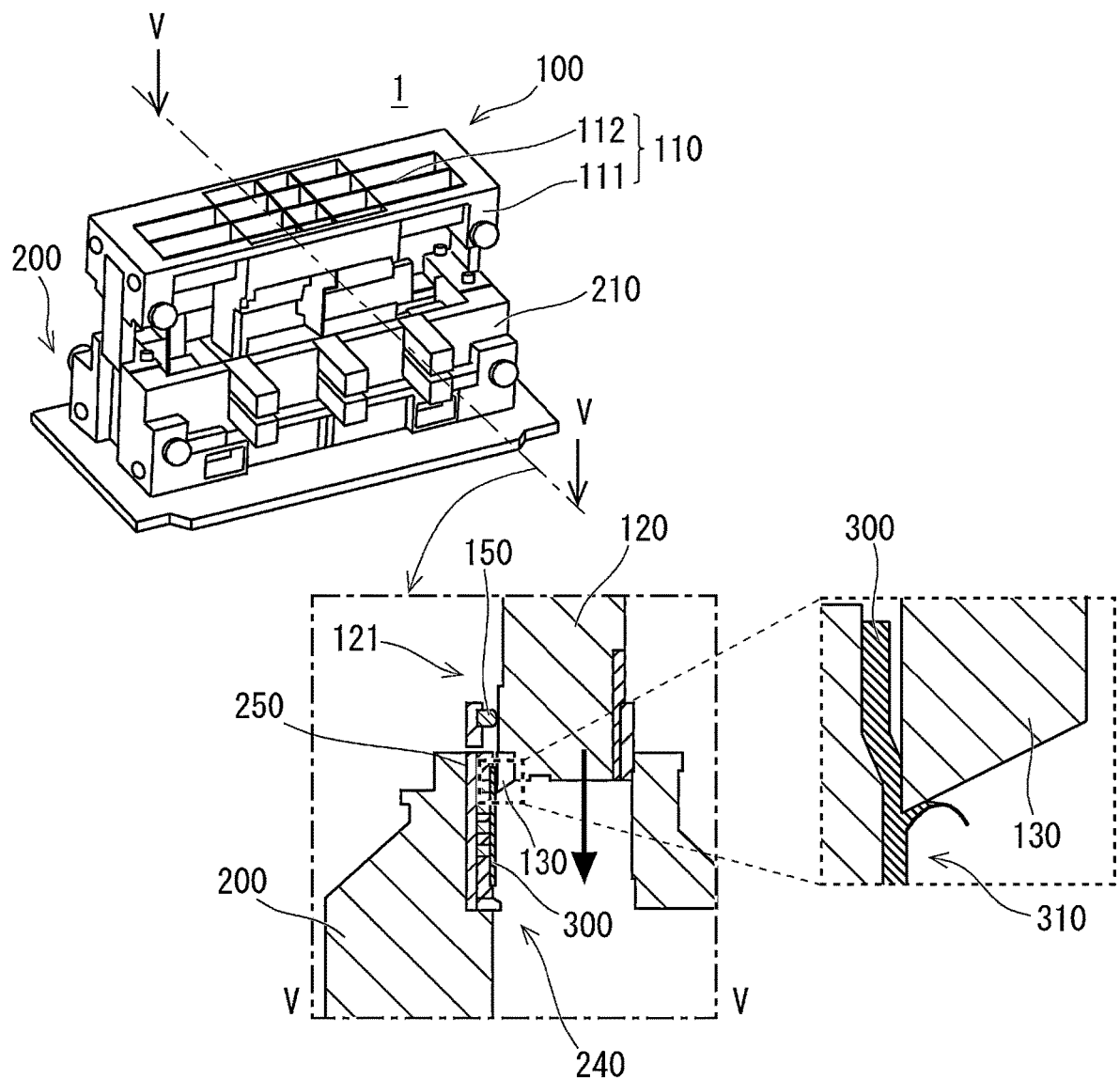
FIG. 5 is a perspective view of a step, showing an example of a configuration of a press apparatus and a method for manufacturing a different-thickness metal plate using the press apparatus according to the first embodiment.

As shown in FIG. 4, the lower die 200 may include a blank pad(s) 270 and a blank-pad air cylinder 280. The blank pad 270 presses the metal plate 300, which has been brought into the upright position along the wall surface 240, against the blank pedestal 250 and/or the wall surface 240 by using the blank-pad air cylinder 280. As described above, the lower die 200 may include the cylinder that presses the metal plate 300 against the blank pedestal 250 and/or the wall surface 240, and fixes the metal plate 300 thereto. The wall surface 240 faces a cavity. The metal plate 300 is rotated in the cavity which the wall surface 240 faces.

Next, a configuration of the upper die 100 will be described. As shown in FIG. 5, the main part 110 is positioned above the lower die 200, for example, when shaving is performed. The main part 110 supports the slide moving part 120. The main part 110 includes, for example, a plurality of supports 111 and a plurality of beams 112 connecting the plurality of supports 111 with one another. Further, the beams 112 of the main part 110 support the slide moving part 120 in such a manner that the slide moving part 120 can descend and ascend. Note that the configuration of the main part 110 is not limited to the configuration using the supports 111 and the beams 112 as long as the main part 110 can support the slide moving part 120 in such a manner that the slide moving part 120 can descend and ascend relative to the main part 110.

The slide moving part 120 descends relative to the main part 110 of the upper die 100 when shaving is performed. When doing so, the slide moving part 120 descends in the cavity along the wall surface 240 of the lower die 200. The slide moving part 120 includes a surface facing the wall surface 240. The surface of the slide moving part 120 that faces the wall surface 240 is referred to as an opposed surface 121. A cutting tool 130 is attached to the opposed surface 121 of the slide moving part 120. The cutting tool 130 is attached, for example, near the lower end of the opposed surface 121 of the slide moving part 120. By lowering the slide moving part 120, it is possible to carry out shaving on at least a part of the plate surface 310 of the metal plate 300, which has been brought into the upright position along the wall surface 240.

The cutting tool 130 is disposed on the opposed surface 121 of the slide moving part 120. The cutting tool 130 performs shaving on the surface of the metal plate 300. The upper die 100 may include a lubricant spray gun 150 that sprays a lubricant when shaving is carried out.

<Method for Manufacturing Different-Thickness Metal Plate>

Next, a method for manufacturing a different-thickness metal plate by using a press apparatus for manufacturing a different-thickness metal plate will be described. As shown in FIG. 2, firstly, a metal plate 300 is disposed in the lower die 200. The metal plate 300 is disposed on the blank pedestal 250 in a horizontally-placed state in which the metal plate 300 is laid down so that its plate surface 310 faces upward. Then, both ends of the metal plate 300 are fixed by the fixing part(s) 220. Specifically, for example, the metal plate 300 is clamped on the blank pedestal 250 by activating a clamp(s) using the clamp air cylinder 260.

Next, as shown in FIG. 3, the blank pedestal 250, on which the metal plate 300 has been fixed, is rotated 90 [deg]. Specifically, the horizontally-placed metal plate 300 is rotated by the rotating mechanism 230 so that the metal plate 300 is brought into an upright position along the wall surface 240, which faces the cavity, in the lower die 200. For example, the metal plate 300, which faces vertically upward, may be brought into the upright position along the wall surface 240 so that the plate surface 310 of the metal plate 300 faces in the horizontal direction.

Next, as shown in FIG. 4, after the step of rotating the metal plate 300, the metal plate 300 is fixed by a cylinder(s) provided in the lower die 200. Specifically, for example, the blank-pad air cylinder 280 may be activated, so that the metal plate 300, which has been brought into the upright position along the wall surface 240, may be pressed against the blank pedestal 250 and/or the wall surface 240 by the blank pad(s) 270. The blank-pad air cylinder 280 is configured (or adjusted) so that at least 3.5% of the force of the shaving can be supported on the rear and front surfaces of the metal plate 300. That is, the blank-pad air cylinder 280 is configured (or adjusted) so that a relation "PA (Air-pad Pressing Force)=0.035×PS (Shaving Force)" holds. When the pressing force of the blank-pad air cylinder 280 is smaller than 3.5% of the shaving force, the metal plate 300 may be detached from the blank pad 270 and the cutting tool 130 or the like could be damaged.

Next, as shown in FIG. 5, the upper die 100 is positioned above the lower die 200, and the slide moving part 120 of the upper die 100 is lowered in the cavity along the wall surface 240. When doing so, shaving is carried out on at least a part of the plate surface 310 of the metal plate 300, which has been brought into the upright position along the wall surface 240, by the cutting tool 130 disposed on the opposed surface 121 of the slide moving part 120.

Figure 6:
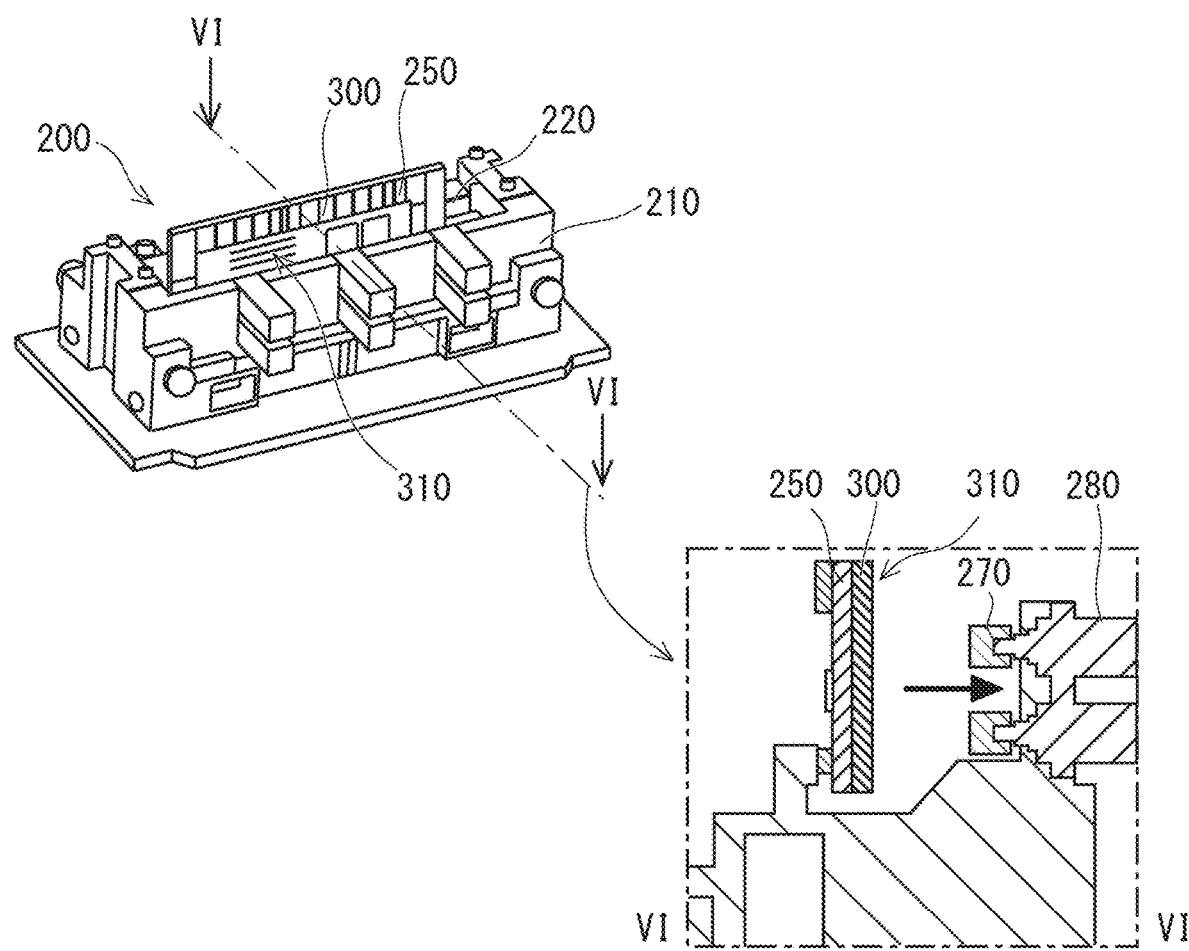
FIG. 6 is a perspective view of a step, showing an example of a configuration of a press apparatus and a method for manufacturing a different-thickness metal plate using the press apparatus according to the first embodiment.

Next, as shown in FIG. 6, the pad(s) of the metal plate 300 are released by activating the blank-pad air cylinder 280 and thereby returning the blank pad(s) 270 to the original position.

Figure 7:
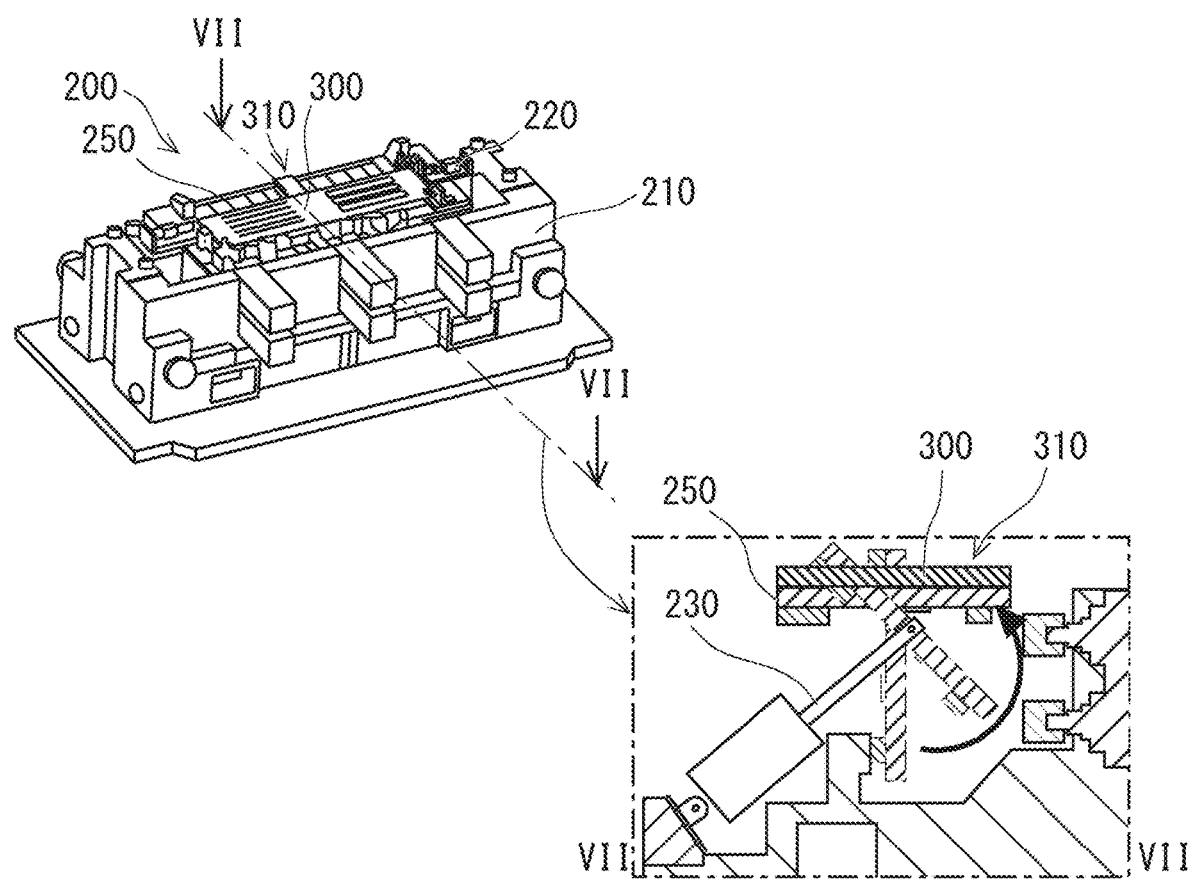
FIG. 7 is a perspective view of a step, showing an example of a configuration of a press apparatus and a method for manufacturing a different-thickness metal plate using the press apparatus according to the first embodiment.

Next, as shown in FIG. 7, the blank pedestal 250, on which the metal plate 300 is fixed, is rotated 90 [deg] in the reverse direction. Specifically, the metal plate 300 is rotated by using the rotating mechanism 230, so that the metal plate 300 is returned to the horizontally-placed state.

Figure 8:
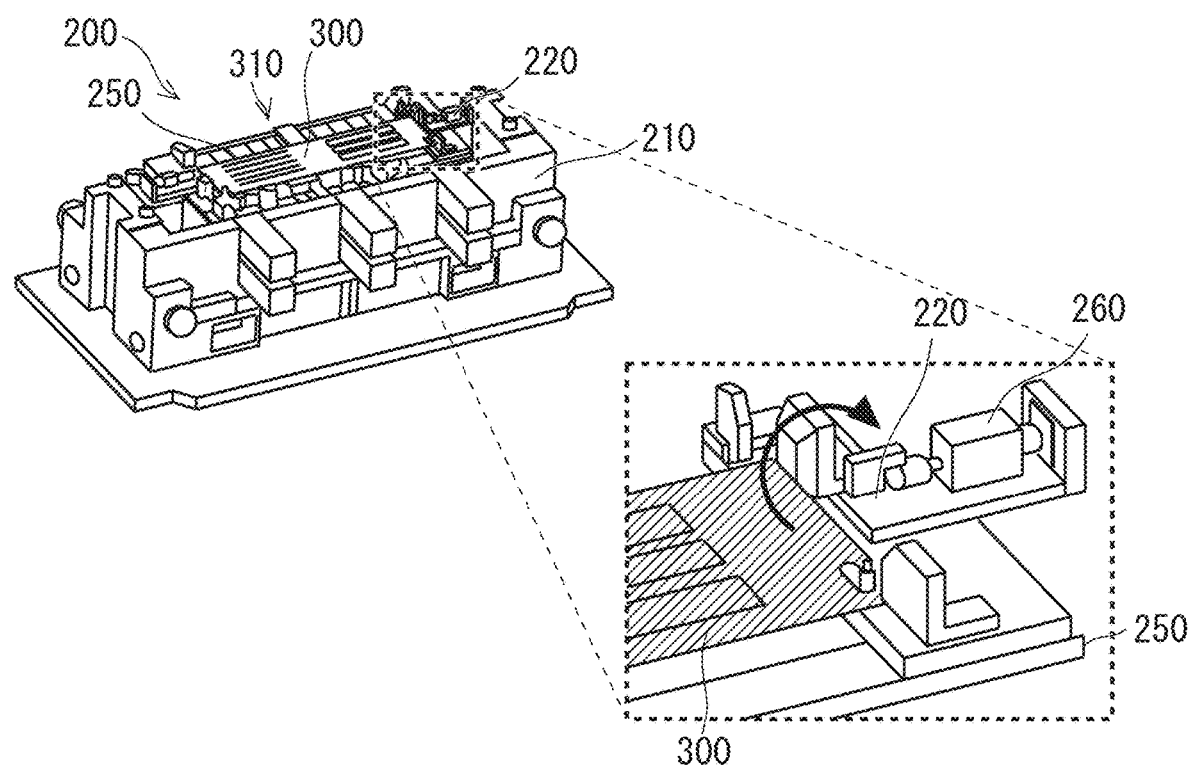
FIG. 8 is a perspective view of a step, showing an example of a configuration of a press apparatus and a method for manufacturing a different-thickness metal plate using the press apparatus according to the first embodiment.

Next, as shown in FIG. 8, the clamping of the metal plate 300 by the fixing part 220 is released. Then, the metal plate 300 is removed from the lower die 200. In this way, a different-thickness metal plate can be manufactured. Note that steps other than those shown in FIG. 5 may be automatically performed by PLC (Programmable Logic Control) control.

Figure 9A:
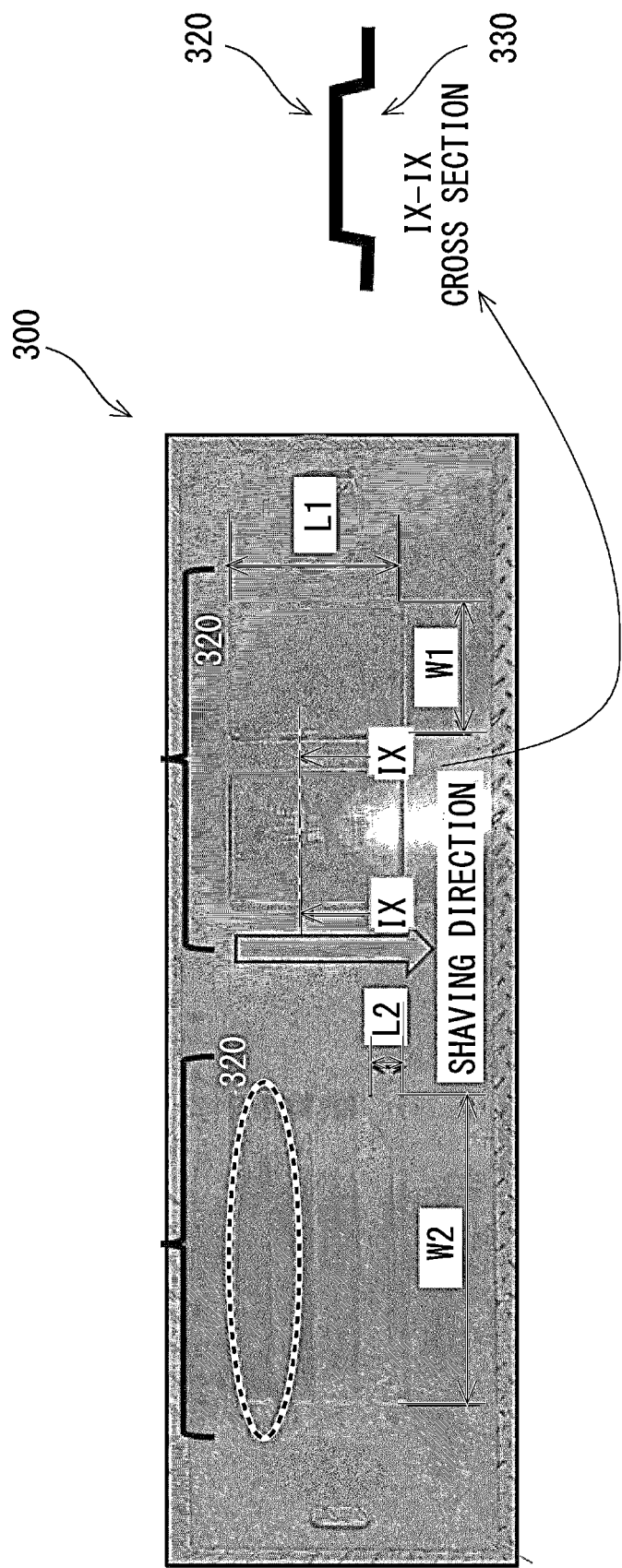
FIG. 9A is a plan view showing an example of projecting parts (i.e., raised parts) of a metal plate before shaving is performed in the press apparatus according to the first embodiment.
Figure 9B:
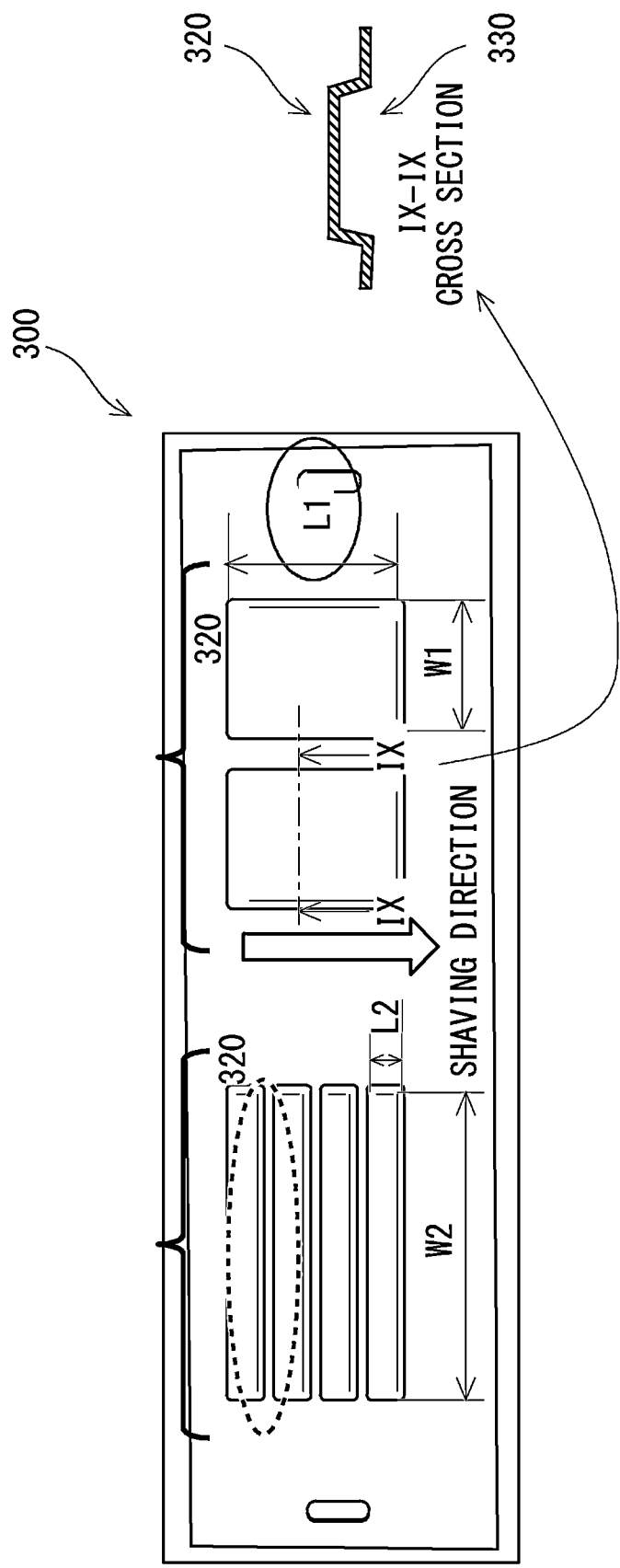
FIG. 9B is a plan view showing an example of projecting parts (i.e., raised parts) of a metal plate before shaving is performed in the press apparatus according to the first embodiment.
Figure 10A:
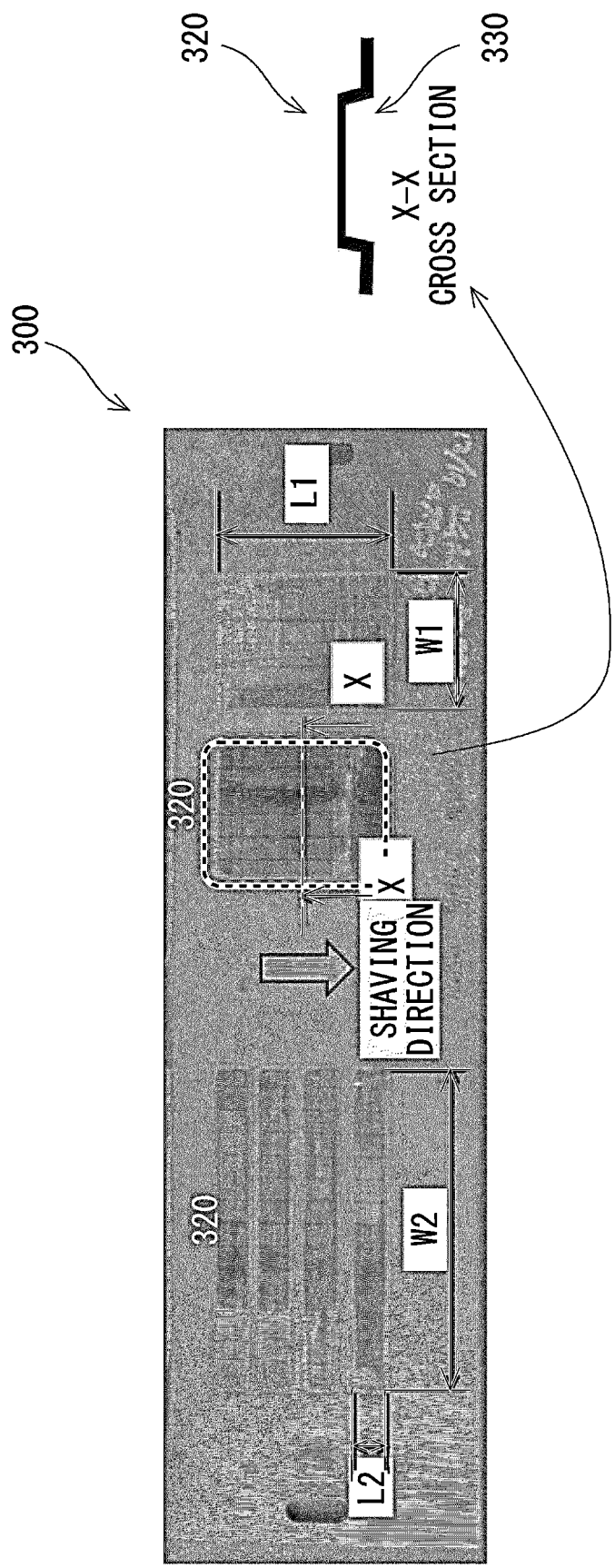
FIG. 10A is a plan view showing an example of projecting parts (i.e., raised parts) of the metal plate after the shaving is performed in the press apparatus according to the first embodiment.
Figure 10B:
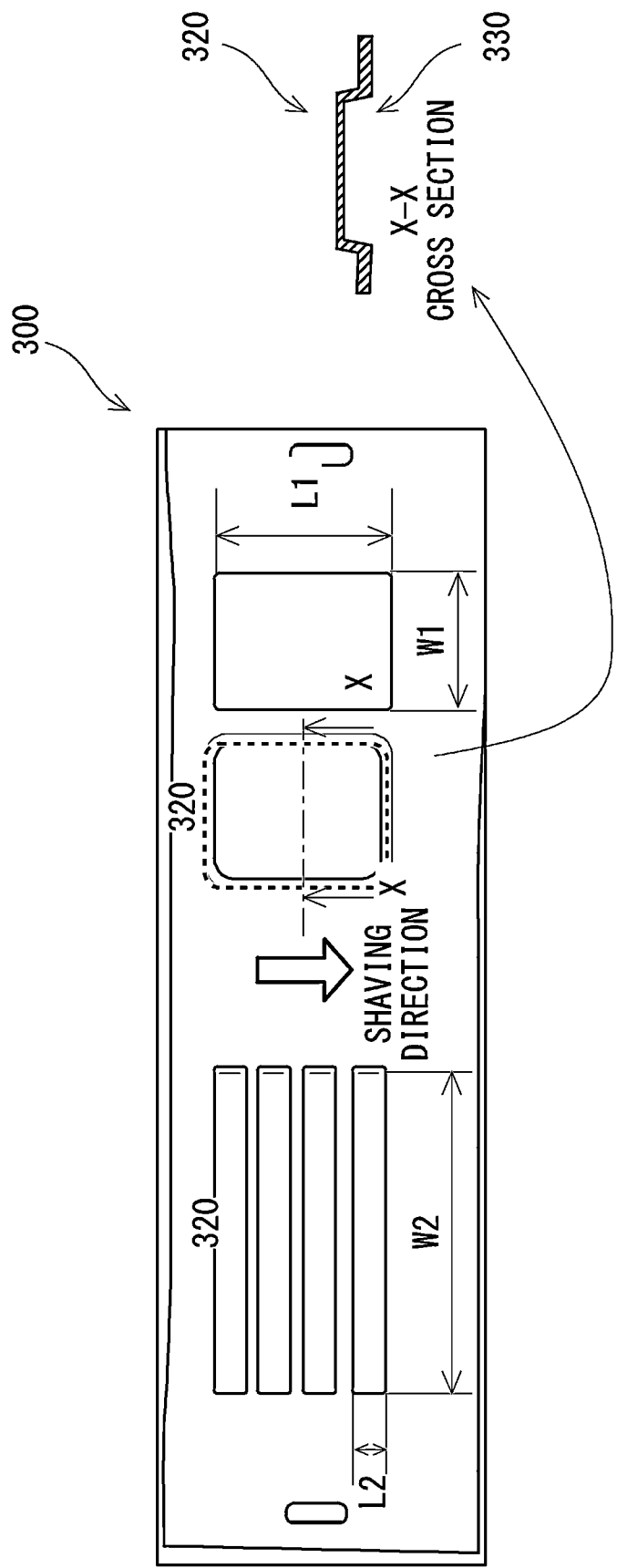
FIG. 10B is a plan view showing an example of projecting parts (i.e., raised parts) of the metal plate after the shaving is performed in the press apparatus according to the first embodiment.

FIG. 9A is a plan view showing an example of projecting parts (i.e., raised parts) 320 of the metal plate 300 before shaving is performed in the press apparatus 1 according to the first embodiment. FIG. 9B is a plan view showing an example of projecting parts (i.e., raised parts) 320 of the metal plate 300 before shaving is performed in the press apparatus 1 according to the first embodiment. FIG. 10A is a plan view showing an example of the projecting parts (i.e., raised parts) 320 of the metal plate 300 after the shaving is performed in the press apparatus 1 according to the first embodiment. FIG. 10B is a plan view showing an example of the projecting parts (i.e., raised parts) 320 of the metal plate 300 after the shaving is performed in the press apparatus 1 according to the first embodiment. Each of FIGS. 9A, 9B, 10A and 10B also shows a cross section of a projecting part 320.

As shown in FIGS. 9A, 9B, 10A and 10B, the manufacturing method may include, before the shaving is carried out, a raised-part forming step, i.e., a step of pressing the metal plate 300 by a press die so that projecting parts 320 are formed on one of plate surfaces 310 of the metal plate 300 and recessed parts 330 are formed on the other plate surface 310 thereof. The projecting part 320 has, for example, a width of W1 and a length of L1. Note that the width W1 is, for example, 120 mm. The length L1 is, for example, 160 mm. Further, the projecting part 320 has, for example, a width of W2 and a length of L2. Note that the width W2 is, for example, 280 mm. The length L2 is, for example, 30 mm. Further, in the step of performing the shaving, the shaving may be performed on the projecting parts 320 or on the recessed parts 330. The thickness Δt is, for example, 0.5 to 1 mm, or may be smaller than that. As described above, the thickness Δt is smaller than or equal to 5% of the lengths L1 and L2.

Figure 11:
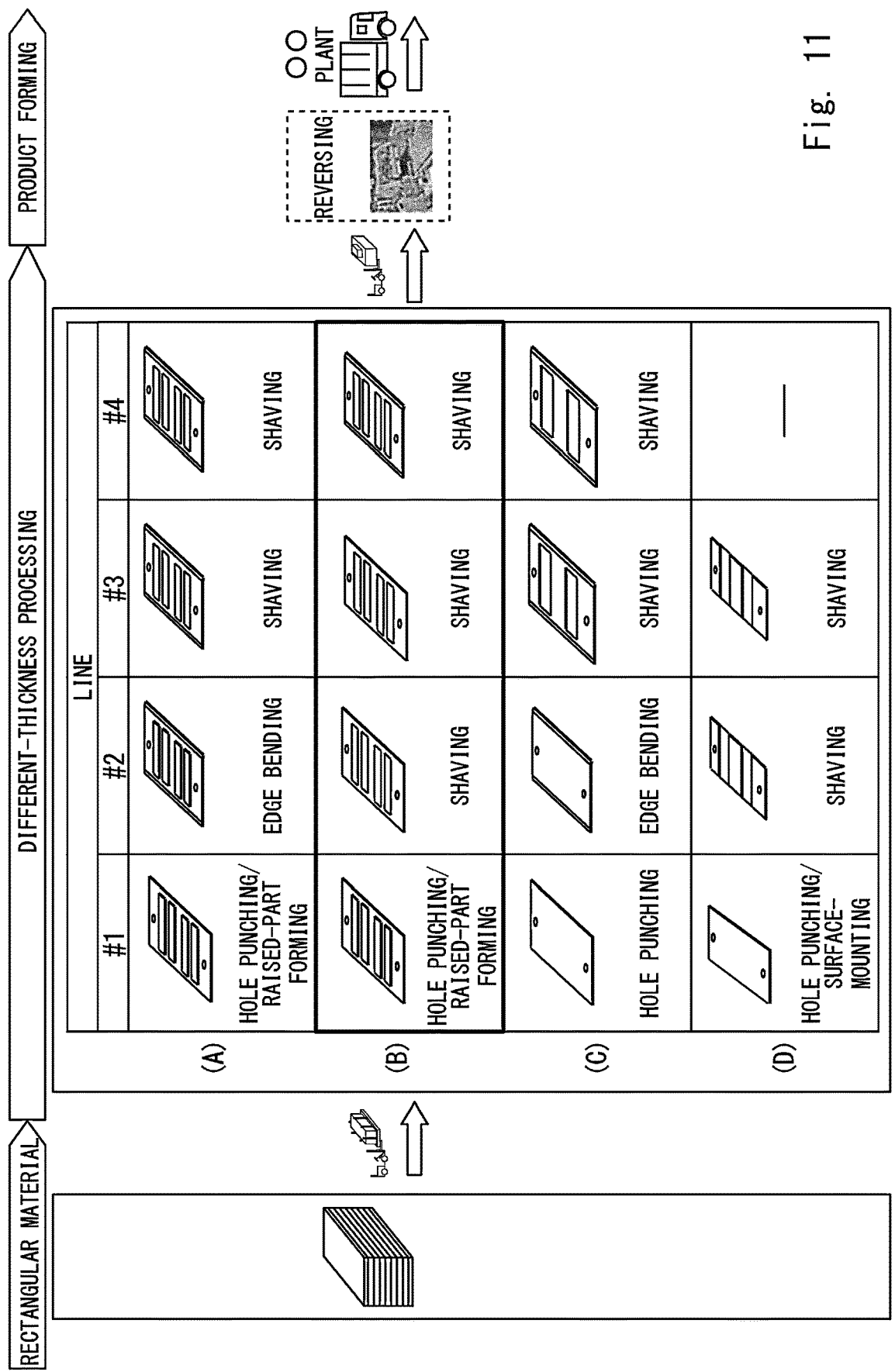
FIG. 11 shows an example of a different-thickness processing step in a method for manufacturing a different-thickness metal plate according to the first embodiment.

FIG. 11 shows an example of a different-thickness processing step in the method for manufacturing a different-thickness metal plate according to the first embodiment. As shown in FIG. 11, the method for manufacturing a different-thickness metal plate may include a step of preparing a rectangular material, a step of performing different-thickness processing, and a step of forming a product. The step of performing the different-thickness processing may include, as a line process (A), hole punching/raised-part forming (#1), edge bending (#2), shaving (#3), and another shaving (#4). Further, the step of performing the different-thickness processing may include, as a line process (B), hole punching/raised-part forming (#1), shaving (#2), another shaving (#3), and another shaving (#4). Further, the step of performing the different-thickness processing may include, as a line process (C), hole punching (#1), edge bending (#2), shaving (#3), and another shaving (#4). Further, the step of performing the different-thickness processing may include, as a line process (D), hole punching/surface-mounting (#1), shaving (#2), and another shaving (#3). As described above, the manufacturing method may include at least one of a hole-punching step and an edge-bending step for the meal plate before the step of performing the shaving.

Next, advantageous effects of this embodiment will be described. The press apparatus 1 according to this embodiment includes the rotating mechanism 230 that rotates the metal plate 300 from a horizontally-placed state to an upright state along the wall surface 240. Therefore, it is possible to perform, for the metal plate 300, shaving by lowering the cutting tool 130. As a result, it is possible to use a general-purpose (i.e., ordinary) press apparatus, thus eliminating the need for a large apparatus for performing pressing in the horizontal direction. Further, after the shaving, the metal plate 300 is returned to the horizontally-placed state and conveyed in that state. As a result, it is possible to perform different-thickness processing in a short time and at low cost.

Further, since the shaving is carried out by using dies including the upper die 100 and the lower die 200, the processing can be performed in any place where a general-purpose (i.e., ordinary) press apparatus is available. Therefore, the manufacturing process can be carried out just by the investment for dies, thereby making it possible to reduce the investment in plant and equipment.

Figure 12:
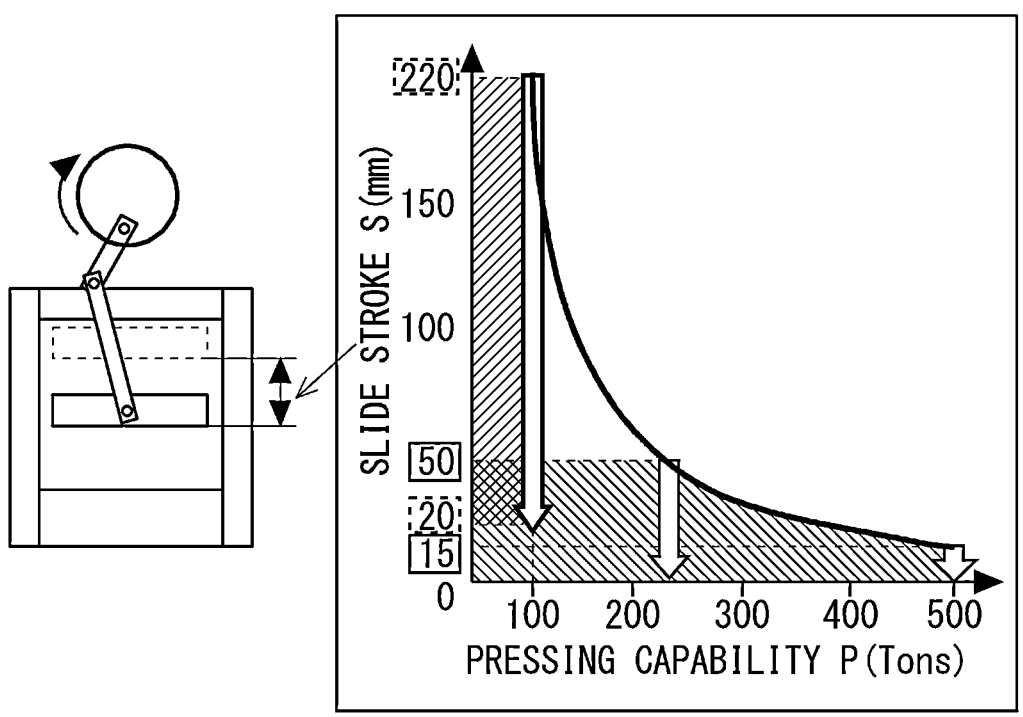
FIG. 12 is a graph showing an example of a relationship between pressing capabilities and slide strokes in a press apparatus, in which the horizontal axis indicates pressing capabilities and the vertical axis indicates slide strokes.

FIG. 12 is a graph showing an example of a relationship between pressing abilities and slide strokes in a press apparatus, in which the horizontal axis indicates pressing abilities and the vertical axis indicates slide strokes. As shown in FIG. 12, for example, in the case of processing by a general-purpose clamp press apparatus, 500 tons of plates are pressed at a stroke of 15 mm. Further, when the cutting (shaving) load for the shaving is limited to 100 tons or smaller and the cutting (shaving) speed is set to 200 mm/sec or higher, a stroke can be set to 200 mm.

The shaving requires a processing stroke ability that is roughly several tens of times higher than that of machining. That is, in the case of 100 tons or smaller, processing can be performed from the top of the stroke. Incidentally, in the case of a 500-ton press apparatus, shaving of "Length of 200 mm×Width of 800 mm×Δt=0.7" can be performed. Note that it is assumed that the strength of the metal plate 300 is lower than or equal to 590 MPa. As described above, the press apparatus 1 according to this embodiment can perform wide and deep shaving in a short time by using a processing stroke ability that is higher than that of machining.

Figure 13:
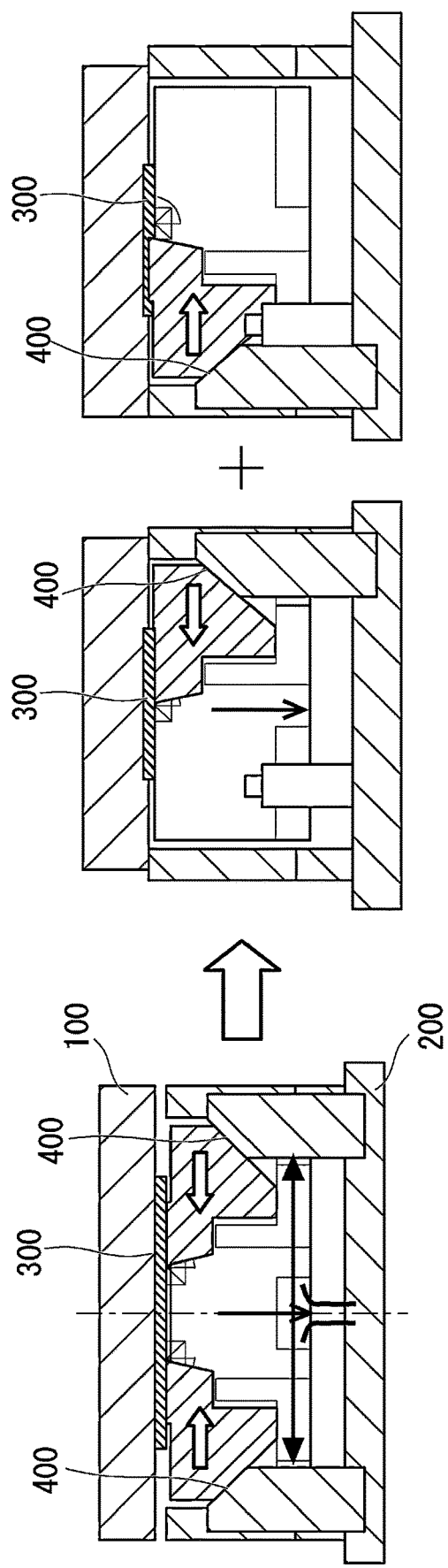
FIG. 13 is a plan view showing an example of a press apparatus according to a comparative example.

FIG. 13 is a plan view showing an example of a press apparatus according to a comparative example. As shown in FIG. 13, the press apparatus according to the comparative example uses a cam mechanism in order to perform shaving on a metal plate 300 in a horizontally-placed state. Specifically, in the press apparatus according to the comparative example, a processing cam 400 is disposed in a mirror configuration (i.e., disposed in an axial-symmetric manner) in a lower die 200. Therefore, the shaving is performed from both sides of a metal plate 300. In the above-described comparative example, a cam space for the processing cam 400 is increased and cannot be contained in the press apparatus. Therefore, it is necessary to divide the cam step into two steps. In contrast to this, this embodiment uses the rotating mechanism instead of the cam mechanism, and a simple die structure including the upper die 100 and lower die 200 is used without increasing the number of processes. Therefore, the manufacturing cost can be reduced.

Further, the press apparatus 1 according to this embodiment also uses the blank-pad air cylinder 280 for fixing a metal plate 300 with the blank pad(s) 270, and hence is able to suppress the deviations (or the shaking or vibrations) of the metal plate 300 and to accurately perform shaving. Further, since the blank-pad air cylinder 280 is highly durable, the service life of the press apparatus 1 can be improved.

Further, the blank-pad air cylinder 280 is configured (or adjusted) so that at least 3.5% of the shaving force can be supported on the rear and front surfaces of the metal plate 300. In this way, it is possible to prevent the metal plate 300 from being disengaged from the blank pad(s) 270 and prevent the cutting tool 130 or the like from being damaged.

The manufacturing method may include, before the step of performing the shaving, a step of pressing the metal plate 300 by a press die so that projecting parts 320 are formed on one of plate surfaces 310 of the metal plate 300 and recessed parts 330 are formed on the other plate surface 310 thereof. Further, the manufacturing method may include, before the step of performing the shaving, a hole punching step and an edge bending step for the metal plate 300. By processing, in advance, parts on which the shaving is not performed, it is possible to integrate a series of operations in a production line, and thereby to improve the productivity.

Second Embodiment

Next, a press apparatus and a method for manufacturing a different-thickness metal plate according to a second embodiment will be described. In the above-described first embodiment, fixing the metal plate 300 by the blank-pad air cylinder 280 has been described. In contrast to this, in this embodiment, the metal plate 300 is pressed against the blank pedestal 250 and/or the wall surface 240 by rollers.

Figure 14:
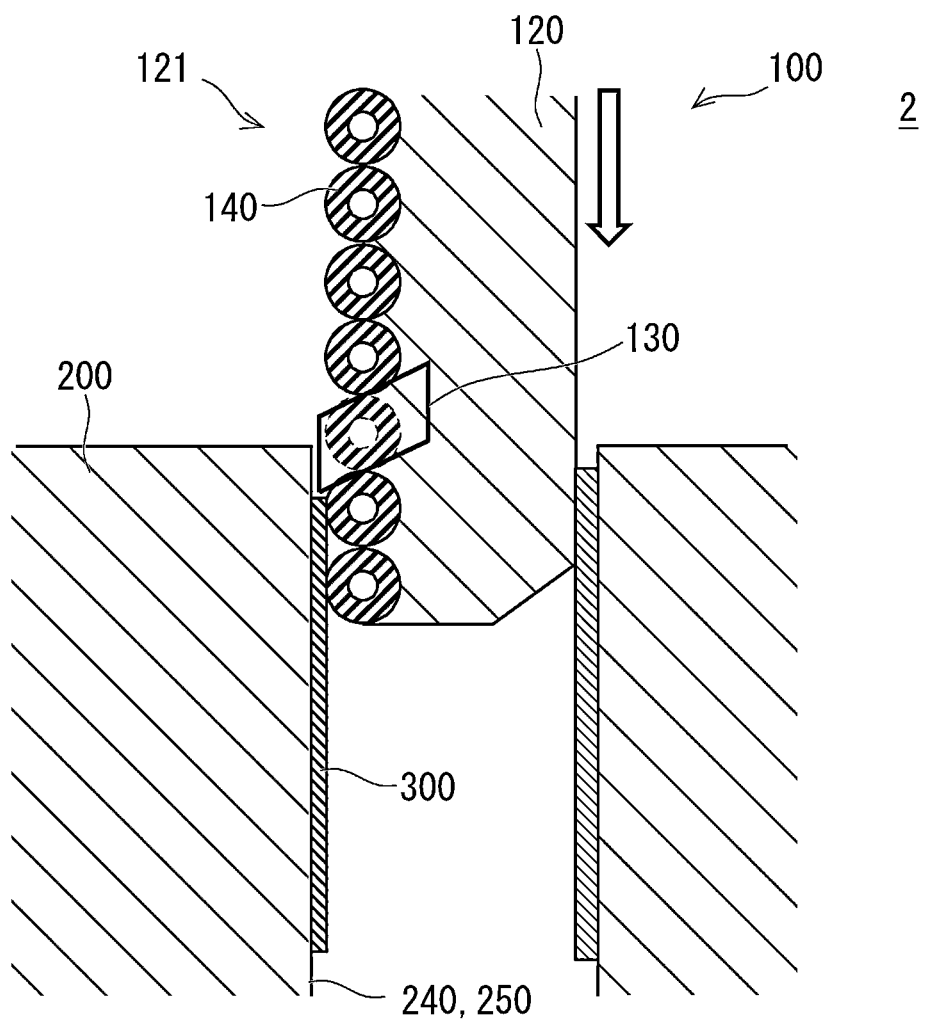
FIG. 14 is a cross-sectional diagram showing an example of rollers provided in a slide moving part in a press apparatus according to a second embodiment.
Figure 15:
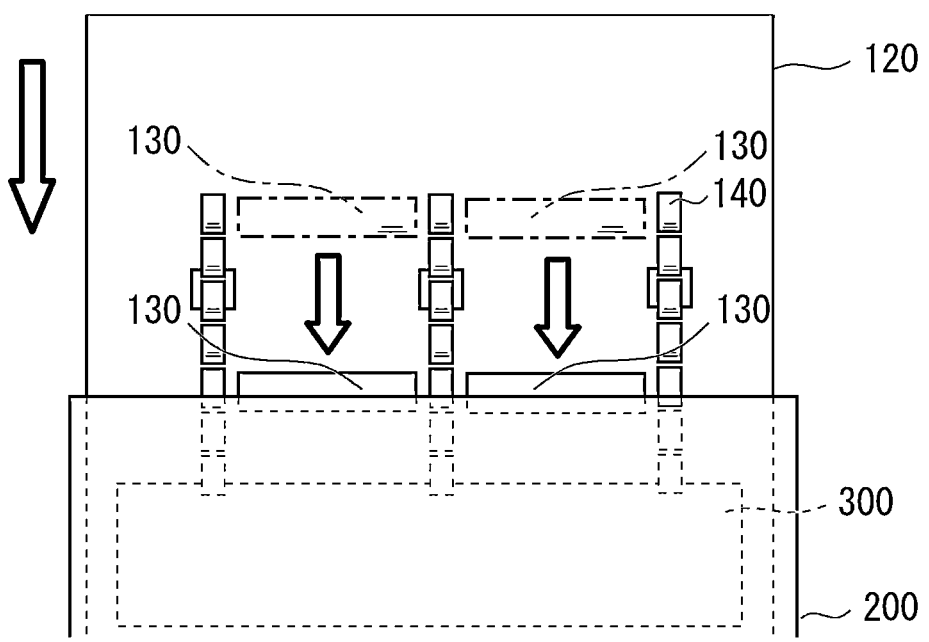
FIG. 15 is a front view showing the example of the rollers provided in the slide moving part in the press apparatus according to the second embodiment.

FIG. 14 is a cross-sectional diagram showing an example of rollers 140 provided in the slide moving part 120 in the press apparatus 2 according to the second embodiment. FIG. 15 is a front view showing the example of the rollers 140 provided in the slide moving part 120 in the press apparatus 2 according to the second embodiment;

As shown in FIGS. 14 and 15, the upper die 100 of the press apparatus 2 according to this embodiment includes rollers 140 projecting from the opposed surface 121 of the slide moving part 120. The rollers 140 move while rotating on the metal plate 300, which has been brought into the upright position along the wall surface 240. The rollers 140 press the metal plate 300 against the blank pedestal 250 and/or the wall surface 240 or the like, and fixes the metal plate 300 thereto. The cutting tool 130 projects beyond the rollers 140 on the opposed surface 121. Shaving is carried out while the rollers 140 are pressing the metal plate 300 when the slide moving part 120 descends.

According to this embodiment, the press apparatus 2 includes the rollers 140 that press the metal plate 300. Therefore, it is possible to perform shaving in a short time while fixing the metal plate 300. Further, when the slide moving part 120 descends, the rollers 140 rotate, so that the deviations of the metal plate 300 in the left/right direction can be suppressed. Therefore, the accuracy of the shaving can be improved. The rest of the components/structures and advantageous effects have already been described in the description of first embodiment.

Third Embodiment

Next, a cutting tool (a shaving tool) of a press apparatus according to a third embodiment will be described. The tip of the cutting tool 130 is worn as the number of times of shaving for metal plates 300 increases. As a result, the quality of the processing surface and the rigidity of the cutting tool 130 deteriorate, thus causing slight movements of the cutting edge of the blade and, in some cases, causing the cutting edge to be chipped. Therefore, when the number of times of shaving reaches a predetermined number, the cutting edge of the cutting tool 130 is ground (i.e., re-sharpened). In this embodiment, the cutting tool 130 has a parallelogram shape (including a rhombus shape) in cross-section. In this way, it is possible to reduce the number of times the cutting tool 130 is replaced.

Figure 16:
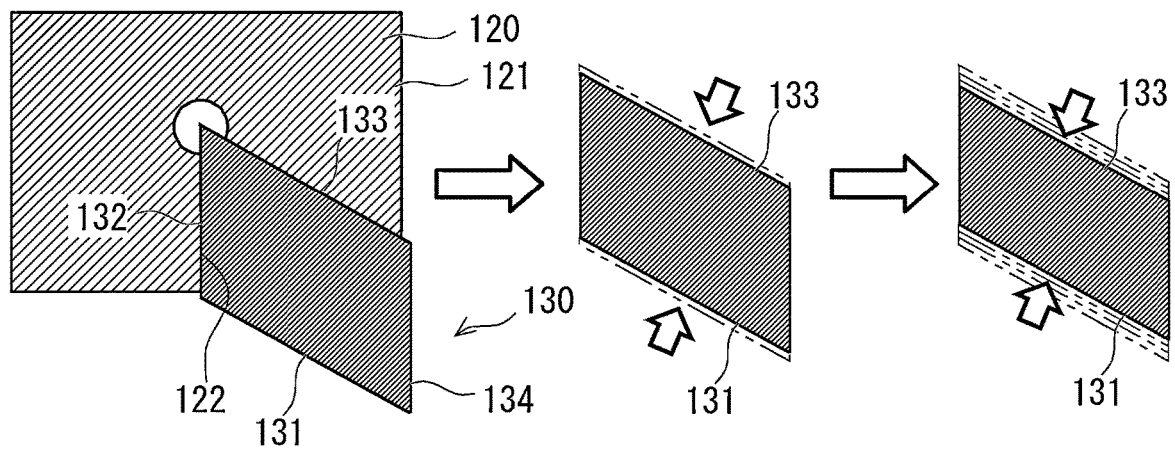
FIG. 16 is a cross-sectional diagram showing an example of a cutting tool provided in a slide moving part in a press apparatus according to a third embodiment.

FIG. 16 is a cross-sectional diagram showing an example of the cutting tool 130 provided in the slide moving part 120 in the press apparatus according to the third embodiment. As shown in FIG. 16, the cutting tool 130 has a parallelogram shape in cross-section as viewed in a direction orthogonal to the direction in which the plate surface 310 of the metal plate 300 faces and the direction in which the cutting tool 130 is moved. The cutting tool 130 includes two cutting edges at diagonal places. Further, after reaching the predetermined number of times of shaving, the cutting edges at the two places are re-ground (i.e., re-sharpened), and then a surface treatment is performed on each of them. When the cutting edges are re-ground, both a surface constituting one side 131 of the parallelogram in cross-section and a surface constituting another side 133 opposed to the one side 131 are re-ground. A surface constituting one side 132 of the parallelogram in cross-section and a surface constituting another side 134 opposed to the one side 132 are not re-ground. By using the cutting tool 130 having the above-described shape, the frequency at which one cutting tool 130 is re-ground can be reduced to half. Ultimately, for example, the cutting edges in the two places are re-ground about three times and the surface treatment is performed three times.

The opposed surface 121 of the slide moving part 120, on which the cutting tool 130 is attached, may have a stepped surface 122 parallel to the opposed surface 121. Further, the surface constituting the one side 132 of the parallelogram is disposed on the stepped surface 122. In this way, it is possible to suppress misalignment when the position of the surface constituting the one side 131 and that of the surface constituting the other side 133 are interchanged, and thereby to improve the accuracy of shaving performed after the re-grinding.

Figure 17:
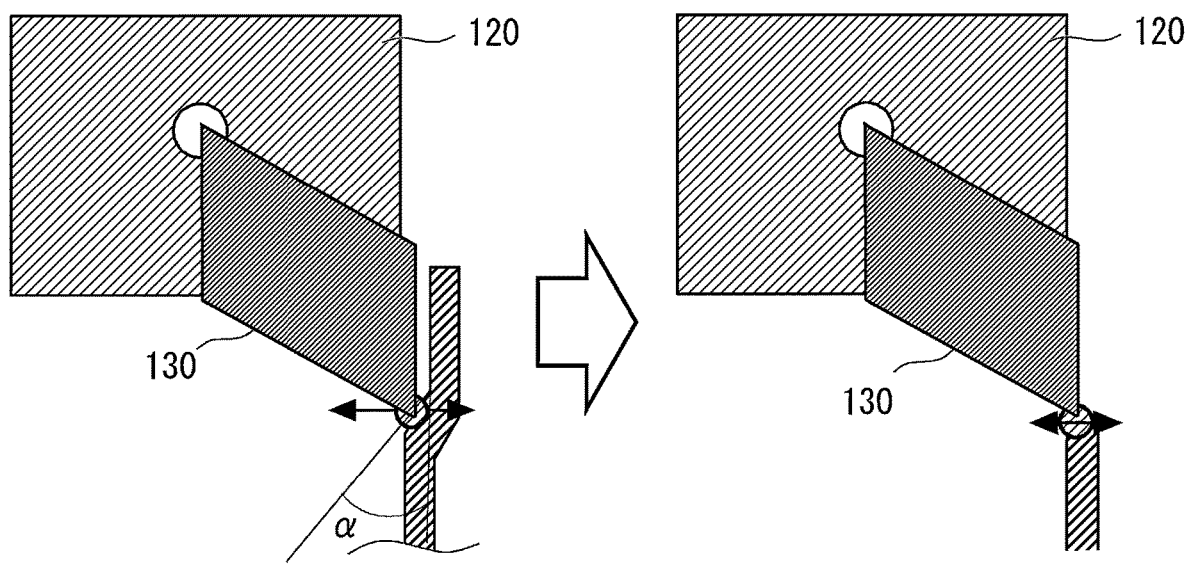
FIG. 17 is a cross-sectional diagram showing the example of the cutting tool provided in the slide moving part in the press apparatus according to the third embodiment.

FIG. 17 is a cross-sectional diagram showing the example of the cutting tool 130 provided in the slide moving part 120 in the press apparatus 3 according to the third embodiment. As shown in FIG. 17, the wearing of the cutting tool 130 can be suppressed (i.e., alleviated) by grinding (i.e., re-sharpening) the cutting edge. Therefore, it is possible to make the cutting edge rigid. As a result, it is possible to reduce the elastic deformation during the processing even when the surface of the metal plate 300 is an inclined surface inclined at about 10 [deg] ($\alpha=10$ [deg]). Therefore, when the cutting tool 130, which has the parallelogram shape in cross-section, is applied to island-like raised parts (i.e., when shaving is carried out on the projecting parts 320), and when the cutting tool 130 is applied to unraised parts (i.e., when shaving is carried out on the flat parts), the slight movements of the cutting edge, which would otherwise be caused at the start of the shaving, can be reduced. Therefore, it is possible to prevent the cutting edge from being chipped due to the slight movements thereof, improve the service life of the cutting tool 130, and reduce the cost for the cutting tool 130.

Figure 18:
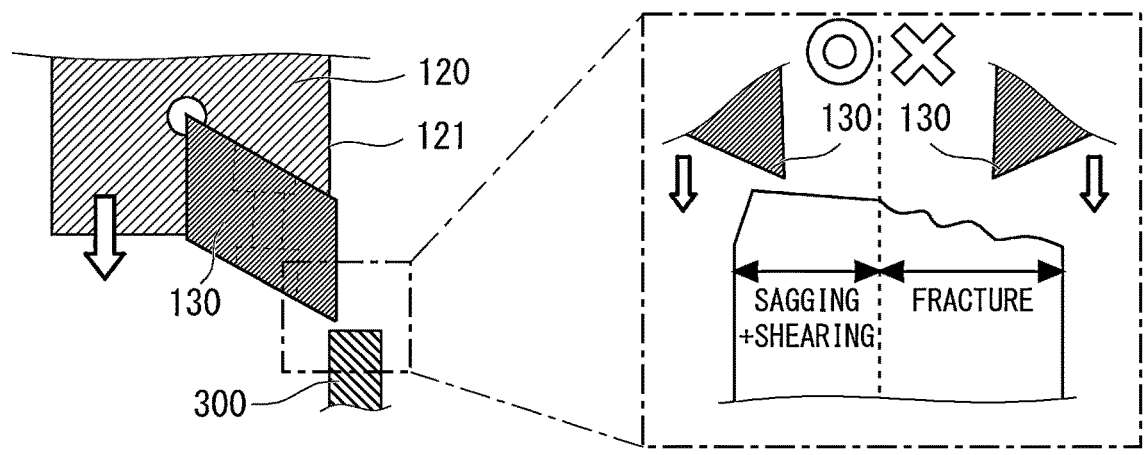
FIG. 18 is a cross-sectional diagram showing the example of the cutting tool in the press apparatus according to the third embodiment.

FIG. 18 is a cross-sectional diagram showing the example of the cutting tool 130 in the press apparatus 3 according to the third embodiment. As shown in FIG. 18, in the case where shaving is performed on the metal plate 300, which is a workpiece to be processed, from the upper end of the metal plate 300 to the bottom end thereof, it is possible to improve the service life of the cutting tool 130 by processing the surface of the upper end by a shearing surface having small surface roughness (sagging+shearing) as compared to when processing the surface by a coarse fracture surface.

Figure 19:
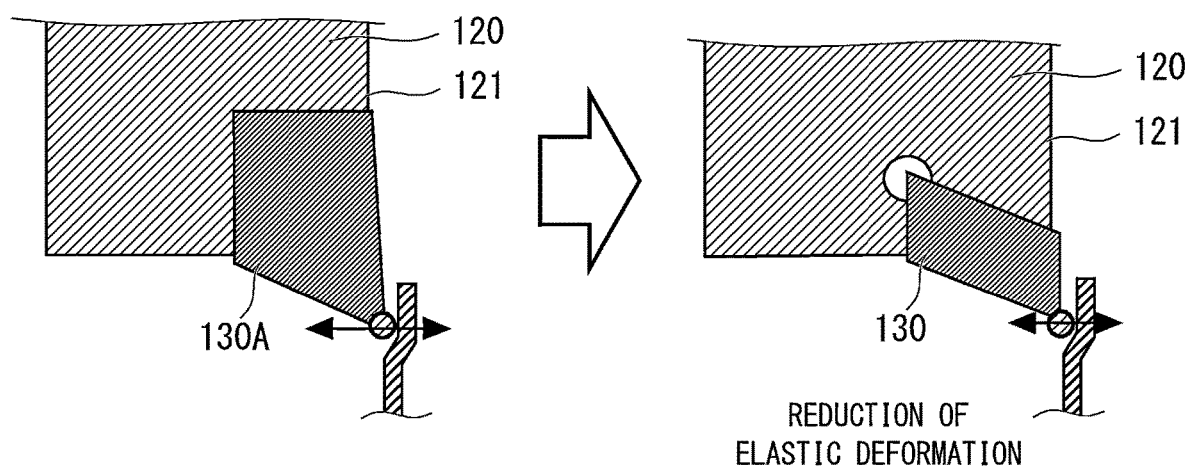
FIG. 19 is a cross-sectional diagram showing the example of the cutting tool in the press apparatus according to the third embodiment.

FIG. 19 is a cross-sectional diagram showing the example of the cutting tool 130 in the press apparatus 3 according to the third embodiment. As shown in FIG. 19, by using the cutting tool 130 having a parallelogram shape in cross-section, the size of the cutting tool 130 can be reduced. Therefore, it is possible to improve the rigidity of the cutting tool 130, suppress the slight movements, and prevent the tip of the cutting tool 130 from being chipped. Further, it is expected that the chipping can be prevented and the accuracy of the thickness can be improved.

According to the press apparatus 3 in accordance with this embodiment, the cutting tool 130 has a parallelogram shape (including a rhombus shape) in cross section, so that the cutting tool 130 includes cutting edges at two places. Therefore, the number of times the cutting tool 130 is replaced can be reduced.

Further, the cutting tool 130, which has the parallelogram shape in cross-section, may be combined with the rollers 140. The surface constituting the one side 132 of the parallelogram of the cutting tool 130 may be disposed on the stepped surface 122, and the surface constituting the other side 134 opposed to the one side 132 may project beyond the rollers 140 on the opposed surface 121. When shaving is performed by using the rollers 140, the cutting tool 130 is disposed so as to project beyond the rollers 140 on the opposed surface 121. In this case, the width by which the cutting tool 130 protrude from the rollers 140 is important for the processing accuracy of the shaving. Since the cutting tool 130 according to this embodiment has the parallelogram shape in cross-section and the distance between the one side 132 and the other side 134 is constant, it is possible to keep the width by which the cutting tool 130 projects from the rollers 140 constant. Therefore, the processing accuracy of the shaving can be improved.

Note that the present disclosure is not limited to the above-described embodiments, and they can be modified as appropriate without departing from the scope and spirit of the disclosure. For example, those that are obtained by combining the configurations of the first to third embodiments as appropriate with one another are also included within the scope of the technical concept of the embodiments.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A press apparatus that is configured to manufacture a different-thickness metal plate, the press apparatus comprising:
- a lower support mechanism for supporting a metal plate that is to be processed into the different-thickness metal plate, the lower support mechanism including:
  - a vertical wall surface;
  - a blank pedestal configured to receive, when in a horizontal orientation, the metal plate that is to be processed into the different-thickness metal plate, the metal plate being received on an upward facing surface of the blank pedestal;
  - clamps that clamp two opposite ends of the metal plate to the blank pedestal with a plate surface of the metal plate facing upward, the plate surface being a surface of the metal plate that is to be processed by shaving; and
  - a rotating mechanism configured to rotate the blank pedestal with the metal plate clamped to the blank pedestal so that the blank pedestal and the metal plate are brought into an upright, vertical orientation along the vertical wall surface, and
- an upper die that includes:
  - a slider that is configured to descend into the lower support mechanism from above the lower support mechanism and includes an opposed surface that faces toward the plate surface of the metal plate while the metal plate and the blank pedestal are in the upright, vertical orientation along the vertical wall surface of the lower support mechanism;
  - a roller projecting from the opposed surface of the slider, and
  - a cutting tool disposed on the opposed surface of the slider, the cutting tool projecting from the opposed surface beyond the roller, wherein
- the press apparatus is configured to process the metal plate by lowering the slider into the lower support mechanism and shaving at least a part of the plate surface of the metal plate with the cutting tool to form the different-thickness metal plate, the shaving being performed while the metal plate is being pressed by the roller when the slider descends.

2. The press apparatus according to claim 1, wherein
the cutting tool has a parallelogram shape in cross-section as viewed in a direction orthogonal to a direction in which the plate surface of the metal plate faces and a direction in which the slider moves,
the opposed surface of the slider includes a stepped surface parallel to the opposed surface, and
a surface constituting one side of the parallelogram is disposed on the stepped surface, and a surface constituting another side of the parallelogram opposed to the one side projects from the opposed surface beyond the roller.

3. The press apparatus according to claim 1, wherein the lower support mechanism includes a cylinder configured to press the metal plate clamped to the blank pedestal against the vertical wall surface of the lower support mechanism while the metal plate and the blank pedestal are in the upright, vertical orientation.

* * * * *